US007070349B2

(12) United States Patent
Dombrowski et al.

(10) Patent No.: US 7,070,349 B2
(45) Date of Patent: Jul. 4, 2006

(54) THIN KEYBOARD AND COMPONENTS FOR ELECTRONICS DEVICES AND METHODS

(75) Inventors: Richard J. Dombrowski, Libertyville, IL (US); Ryszard J. Gordecki, Green Oaks, IL (US); Daniel P. Rodgers, Chicago, IL (US); Patrick J. Cauwels, South Beloit, IL (US); Steve C. Emmert, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 7 days.

(21) Appl. No.: 10/871,664

(22) Filed: Jun. 18, 2004

(65) Prior Publication Data

US 2005/0281605 A1 Dec. 22, 2005

(51) Int. Cl.
*B41J 5/00* (2006.01)

(52) U.S. Cl. .................. 400/490; 200/5 A; 361/680; 400/491.1

(58) Field of Classification Search ................ 361/680; 200/5 A, 5 B; 400/490, 491, 491.1
See application file for complete search history.

(56) References Cited

U.S. PATENT DOCUMENTS

| 4,307,268 A | * | 12/1981 | Harper ................. 200/5 A |
| 4,812,831 A | | 3/1989 | Laier |
| 5,220,521 A | * | 6/1993 | Kikinis ................. 708/138 |
| 5,494,363 A | * | 2/1996 | Hochgesang ............ 400/495 |
| 5,797,482 A | | 8/1998 | LaPointe et al. |
| 5,871,088 A | | 2/1999 | Tanabe |
| 5,924,555 A | | 7/1999 | Sadamori et al. |
| 5,950,808 A | | 9/1999 | Tanabe et al. |
| 6,263,070 B1 | | 7/2001 | Kubo et al. |
| 6,373,008 B1 | | 4/2002 | Saito et al. |
| 6,444,928 B1 | * | 9/2002 | Okamoto et al. ......... 200/5 A |
| 6,462,294 B1 | * | 10/2002 | Davidson et al. ......... 200/512 |
| 6,821,467 B1 | * | 11/2004 | Wolfe et al. ............. 264/155 |
| 2002/0025837 A1 | | 2/2002 | Levy |
| 2004/0031673 A1 | | 2/2004 | Levy |
| 2004/0102232 A1 | | 5/2004 | Nuovo |

FOREIGN PATENT DOCUMENTS

DE 37 36 892 A1 5/1988

(Continued)

OTHER PUBLICATIONS

"DUREL® Introduces New" DFLX™"Durel Flexible Electroluminescent Lamp for High-Quality Keypad Lighting", http://www.rogers-corp.com/dflx.htm, 2 pages.
"Rogers Corp. in Full Scale Production of "DFLX"™$^{Lamps}$ Its Newest Electroluminescent (EL) Product Through An Exclusive Worldwide Licensing Agreement", http://www.rogers-corp.com/dflxlamps.htm, 2 pages.
Bob Hetherington; "Philips iPronto Remote Control"; 3 pages; www.hometoys.com/nfinews/oct03/reviews/ipronto.htm.

*Primary Examiner*—Andrew H. Hirshfeld
*Assistant Examiner*—Dave A. Ghatt
(74) *Attorney, Agent, or Firm*—Roland K. Bowler, II

(57) ABSTRACT

A keypad assembly, the keypad assembly including a keycap layer 110 having multiple user interface key caps flexibly coupled to a carrier portion, a luminescent layer 120 disposed toward a backside of the plurality of key caps, the luminescent layer carrying a plurality of switch domes each aligned with a corresponding one of the plurality of key caps of the key cap layer. In some embodiments, a backing material is applied to a backside of the user interface key caps.

8 Claims, 6 Drawing Sheets

FOREIGN PATENT DOCUMENTS

| | | |
|---|---|---|
| DE | 38 16 182 A1 | 11/1989 |
| DE | 94 15 289 U | 4/1995 |
| EP | 0 818 793 B1 | 1/1998 |
| EP | 0 847 066 B1 | 6/1998 |
| EP | 1 017 076 A2 | 7/2000 |
| EP | 1 035 557 A2 | 9/2000 |
| JP | 09-093324 | 4/1997 |
| JP | 09106729 A | 4/1997 |

* cited by examiner

THIN KEYBOARD AND COMPONENTS FOR ELECTRONICS DEVICES AND METHODS

FIELD OF THE DISCLOSURE

The present disclosure relates generally to input devices, and more particularly to keypad assemblies and keypad components, for example, keypad assemblies and components for use in super-thin applications, for example, in wireless communications devices, and corresponding methods.

BACKGROUND OF THE DISCLOSURE

In the past, keypads on cellular radiotelephones device have comprised a multi-layered structure having a large part count that is relatively thick, thus limiting the thinness of the devices in which the keypad is integrated. Typical keypads include a user interface forming user accessible key caps, which are sometimes interconnected by a web. The key caps are each aligned over a corresponding switch-dome mounted on a carrier made of Mylar or some other carrier material. The carrier and dome assembly is disposed on a switch contact circuitry layer.

To provide keypad lighting, it is known to dispose a luminescent layer between the dome carrier and the key caps. The luminescent layer however includes cutouts through which plunger portions of the key caps may contact the domes to actuate switches on the circuit layer. This configuration lacks luminescence directly below or behind the key caps where it is desired most. Instead, the key caps are lighted indirectly by dispersed light, some of which emanates from circumferential areas surrounding the keys.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
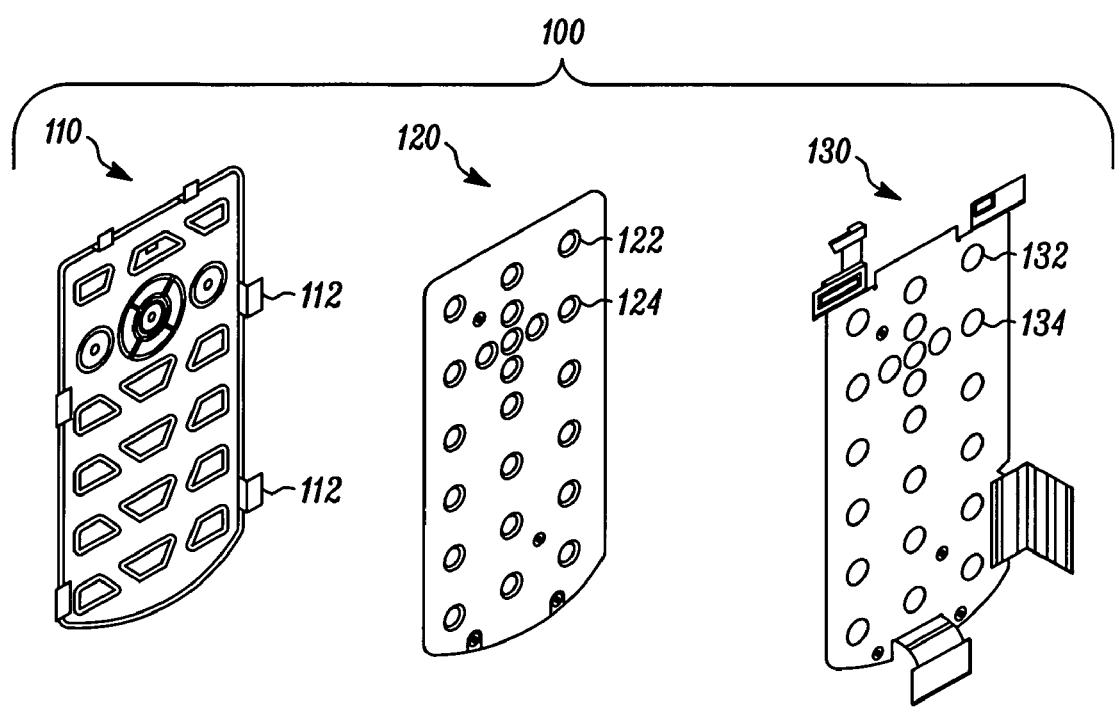
FIG. 1 is an exemplary keypad assembly.

FIG. 1 illustrates an exploded view of an exemplary keypad assembly 100 comprising generally a user interface key cap layer assembly 110, a switch-dome/luminescent layer assembly 120 and a keypad circuitry layer 130. The exemplary keypad assembly 100 and variations thereof, which will become more apparent from the discussion below, have applications in handheld electronics devices, for example, in calculators, personal organizers, personal digital assistants, wired and wireless communications devices including cellular telephones, and portable computing machines, among other devices.

Figure 5:
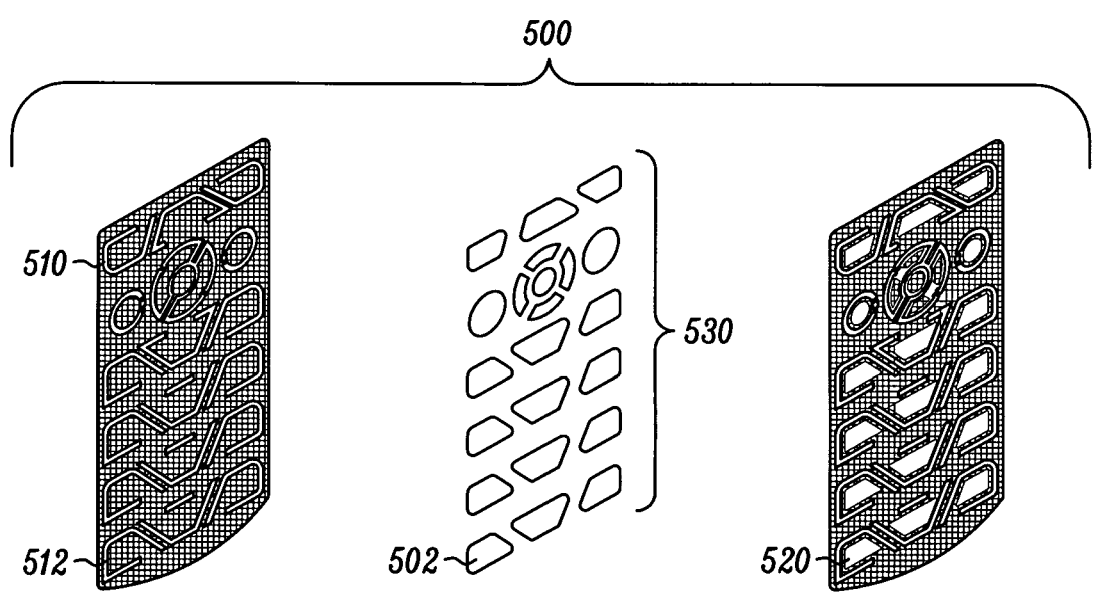
FIG. 5 is an exploded view of an exemplary key cap layer assembly.

The exemplary key cap assembly layer 110 comprises generally a key cap layer having a plurality of user interface key caps flexibly coupled to a carrier or carrier portions. FIG. 5 illustrates an exemplary key cap layer 510. In one embodiment, each key cap is flexibly coupled to the carrier along at least one side of the key cap, and other remaining sides of the key cap are separated from other key caps and/or carrier portions by a space, thereby allowing the key caps to flex in response to a tactile depressing action by a user. In another embodiment, each of the plurality of user interface key caps are coupled to the carrier by a flexible carrier portion disposed along not more than one side of the corresponding user interface key cap, wherein other sides of each of the user interface key caps are separated from neighboring key caps and/or carrier portions by a space.

Figure 2:
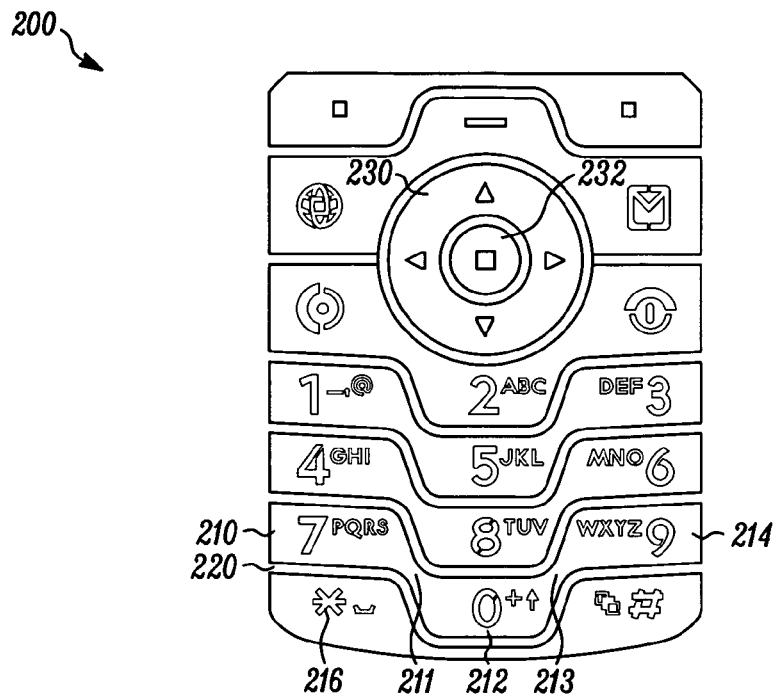
FIG. 2 is an exemplary key cap layer.

FIG. 2 illustrates an exemplary key cap assembly layer 200 viewed from the user interface side thereof. The exemplary keypad assembly layer 200 includes a plurality of key caps, for example, the "7" key cap 210, the "0" key cap 212 and the "9" key cap 214, flexibly coupled by intermediate carrier portions 211 and 213. FIG. 2 also illustrates space between adjacent key caps and between key caps and carrier portions. For example, there is space 220 between key cap 210 and the "*" key cap 216. The same space 220 separates key cap 216 from the carrier portion 211. In FIG. 2, at least some of the plurality of key caps and some of the carrier portions form a unitary member, for example, key caps 210, 212, 214 and carrier portions 211 and 213 form a unitary member.

Figure 3:
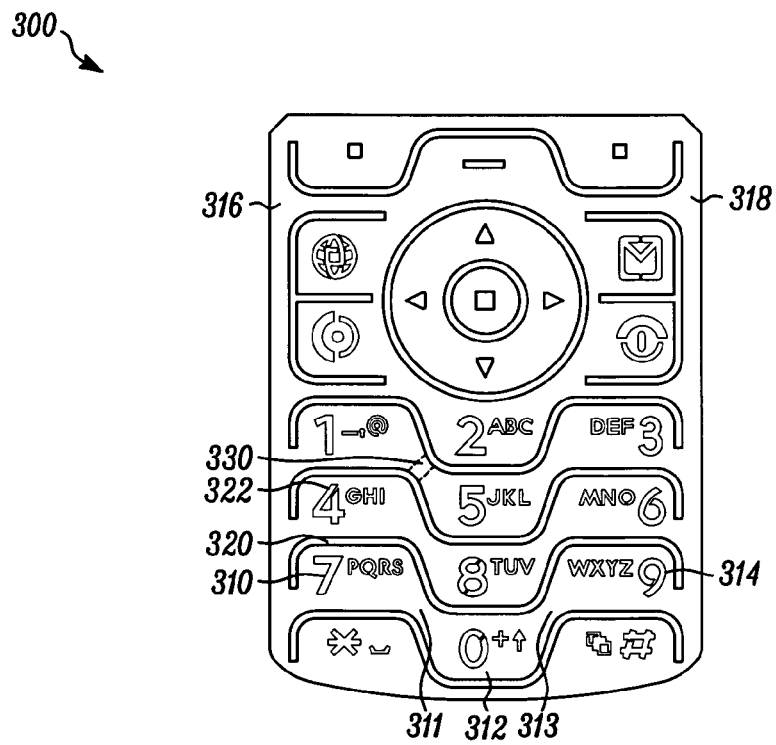
FIG. 3 is another exemplary key cap layer.

FIG. 3 illustrates another exemplary key cap assembly layer 300 viewed from the user interface side thereof. The exemplary keypad assembly layer 300 includes a plurality of key caps, for example, the "7" key cap 310, the "0" key cap 312, and the "9" key cap 314, flexibly coupled to intermediate carrier portions 311 and 313. The key cap assembly layer of FIG. 3 is distinguished from that of FIG. 2 by a carrier portion or portions 316 and 318 along lateral sides of the plurality of user interface key caps. The exemplary lateral carrier portions 316 and 318 interconnect all of the rows of key caps, for example, the row containing key caps "1", "5" and "3" and the row containing key caps "4", "8" and "6", thereby forming a unitary member comprising the plurality of key caps and carrier portions. FIG. 3 also illustrates spaces between adjacent key caps and between key caps and the carrier portions. For example, there is space 320 between key cap 310 and the numeral "4" key cap 322. The space 320 also extends between key cap 310 and the carrier portion 3–16.

FIG. 5 illustrates an exploded view of an exemplary key cap assembly layer 500 comprising a key cap layer 510, and a flexible web 520 applied to a backside of the key cap layer. In one embodiment, the key cap layer including the plurality of user interface key caps flexibly coupled to the carrier is formed from a single sheet of material, for example, stainless steel, or aluminum, or phosphor bronze, or copper alloy or some other suitable metal material. In one exemplary embodiment, the key cap layer is grade SS304 stainless steel in other embodiments, the key cap layer is formed of a synthetic or composite material with suitable rigidity and flexibility characteristics. In some embodiments, the plurality of key caps are defined by forming the spaces in a stamping process or in some other material removal process, for example, by chemical or laser etching, high velocity fluid cutting, etc. In other embodiments, the key caps are formed in a molding or casting or some other fabricating process. In one embodiment, the key cap layer is not more than 1.5 mm thick, and in an exemplary super-thin keypad application the key cap layer is between approximately 0.2 and approximately 0.3 mm thick. These exemplary ranges however are not intended to be limiting. Other exemplary ranges are discussed below.

Figure 4:
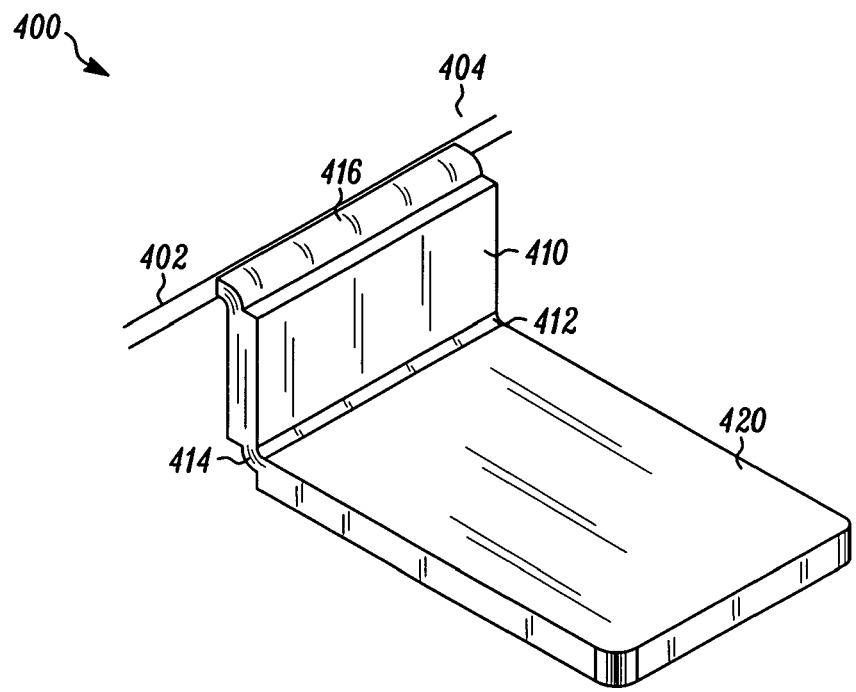
FIG. 4 is an exemplary key cap layer fastening tab.

In FIG. 1, the exemplary key cap assembly layer 110 comprises a plurality of fastening tabs protruding from the side portions of the key cap layer. FIG. 4 is a more detailed view of an exemplary fastening tab 400. The fastening tab 400 includes a first flange 410 extending from a lateral carrier portion 404 of the key cap, and a second flange 420 extending from the first flange. The fastening tab is preferably formed unitarily with the key caps and the carrier from a single sheet of material, though in other embodiments the fastening tabs may be appended by some fastening means. FIG. 4 illustrates a bent corner portion 412 between the first flange and the second flange.

In some embodiments, the corner portion 412 is formed along a thinned portion 414 of the sheet material from which the fastening tab is fabricated. The thinned portion 414 facilitates formation of the corner portion and may be formed by etching or some other process. FIG. 4 also illustrates a corner portion 416 between the lateral carrier portion and the first flange 410. In one embodiment, the corner portion 416 is thinned to facilitate bending and to provide continuity of an edge portion 402 along the lateral carrier portion 404. Unlike conventional key pad assemblies that must be installed from the inside of electronics device housings, keypad assemblies comprising the exemplary key cap layers disclose herein may be installed from the outside of the device housing and be fastened to the housing by the fastening tabs.

In some embodiments, the flexible portion of the carrier flexibly coupling the plurality of user interface key caps to the carrier portion is relatively thin compared to other portions of the carrier and/or key caps. In FIG. 3, for example, the carrier portion 330 between key caps "1" and "5" has reduced thickness to provide increased flexibility. The amount of any required carrier thinning is dependent on many factors, including, among others, the thickness and rigidity of the sheet material from which the carrier and key caps are formed, desired tactile performance, etc. In one embodiment, the thinned carrier portion is formed by etching or by some other material removal process applied to the surface of the sheet material from which the key cap layer is formed.

In one embodiment, a flexible web interconnects at least some of the plurality of user interface key caps. The flexible web generally bridges the space between the plurality of user interface key caps and the space between the key caps and any carrier portions, for example, lateral carrier portions 316 and 318 in FIG. 3. The flexible web generally prevents debris from entering into the space between the keycaps, and in some embodiments the flexible web forms part of the exterior of the key cap layer.

in one embodiment, the flexible web interconnecting the plurality of user interface key caps comprises a material different than the material of the user interface key caps. In one exemplary embodiment, the flexible web is a resilient material, for example, silicone. More generally, in other embodiments, the flexible web may be some other elastomer material. In one embodiment, the flexible web is formed of a translucent material that permits emanation of backlighting from the luminescent layer, which is discussed further below. The flexible web may be clear or tinted to provide contrast relative to the key caps. In some embodiments, the flexible material is doped with other materials to provide special effects and/or it may be coated with ink or other coloration.

FIG. 5 illustrates the exemplary key cap assembly layer 500 comprising the key cap layer 510 discussed above, and a flexible web 520 applied to a backside of the key cap layer. The exemplary flexible web 520 may be molded, for example, injection molded or insert molded or otherwise deposited on the backside of the key cap layer. In one embodiment, the flexible web material protrudes into the space between key caps and any carrier portions, and in some embodiments the flexible web forms part of the visible exterior of the key cap layer. In FIG. 5, the exemplary flexible web 520 is applied largely to the carrier and partly to the key caps, leaving portions of the key cap exposed for the application of another backing material discussed further below.

In other embodiments, the flexible web may be a flexible web film disposed over or applied to an outer surface of the key cap layer. In another alternative embodiment, the flexible web and the plurality of user interface key caps comprise a common material forming the unitary member. According to this alternative embodiment, the flexible web is formed from the sheet material from which the key cap layer is formed. In one embodiment, the flexible web portions between key caps and any carrier portions is formed by reducing the thickness of portions of the sheet material, for example, by etching. In this embodiment, the removed portion of the sheet material forms the space between individual key caps, and the reduced thickness portion of the sheet material also forms the flexible web bridging the space.

In one exemplary key cap layer assembly, a backing material is disposed on the backside of corresponding key caps. In some embodiments, the backing material provides rigidity for the key caps, particularly in applications where the key cap is relatively thin and also in embodiments where the key cap material is insufficiently rigid to provide the desired tactile performance. In the exemplary embodiment of FIG. 5, backing material portions 530 are disposed on corresponding key caps of the key cap layer 510, for example, backing portion 502 is applied to key cap 512.

In some embodiments, the backing material is different than the material constituting the flexible web. For the example, the flexible web may be a relatively resilient or elastic material and the backing material may be a relatively rigid or hard material. In one exemplary embodiment, the backing is a TOYOLAC 900 Series material. In some embodiments, the backing material is doped with materials to provide special effects and/or it may be coated with ink or other coloration.

In one exemplary application process, the backing material is applied to a backside of a plurality of key caps, for example, keycaps flexibly interconnected by a carrier portion. In embodiments where multiple user interface key caps are flexibly coupled to one or more carrier portions, a flexible web is applied to the backside of the key cap layer. In one embodiment, the flexible web is applied to the backside of the key cap layer. The flexible web may be applied by any application procedure, for example, by an insert molding process. In an alternative embodiment, the resilient material is applied to the key cap first, so that the resilient material forms a wall portion surrounding the portion of the key cap where the backing material is desired. The backing material is then applied to the portion of the key cap surrounded by the resilient material wall portion, wherein the resilient material wall portion captures the backing material applied to the key cap. In another alternative embodiment, the backing material is part of the flexible web disposed on the backside of the key caps.

In some embodiments, some or all of the key caps have artwork disposed thereon for indicating functionality and/or for providing other information associated with the corresponding key cap. The artwork may be printed or imprinted on the key cap. In other embodiments, embossed or intaglio artwork is applied to the key caps, for example, to a home key like the "5" key, or to all of the key caps to provide a tactile interface.

The exemplary key cap layers 200 and 300 of FIGS. 2 and 3 comprise key caps including artwork apertures. The exemplary artwork apertures include alphanumeric characters and other functional symbols suitable for use in a communications device application. In some embodiments, the key cap backing material covers or fills the artwork aperture. In one embodiment, the backing material is a clear or tinted translucent material that permits light to emanate from a luminescent layer disposed below the key caps as discussed further below. According to a related aspect of the disclosure, the backing material disposed in the artwork aperture may be used to capture portions of the artwork that would otherwise require support structure or be susceptible to dislodgement. These captured artwork portions include, for example, the center portions of the numerals "0", "4", "6", "8" etc. A tactile interface may be formed on some or all of the key caps as discussed above or by allowing some of the backing material to protrude through the artwork aperture beyond the surface of the key cap. The tactile interface may also be produced by embossing or by an intaglio process.

According to another process for making the key cap layer assembly, key cap function or identification artwork is etched in a relatively thin metal sheet, for example, a thickness between 0.2 mm and 0.3 mm. Then a hard translucent plastic material is molded to a backside of the metal sheet where the key caps will be defined. Next, the key cap perimeters are etched in the thin sheet. And then the flexible web is formed around the key cap perimeter, as discussed above. The flexible web allows the key caps to move independently, and it also prevents the key caps from being pulled up. As a final step, the key caps may be subject to finishing operations to polish the cosmetic surface and/or to remove excess molded in material from the key cap layer.

Figure 6:
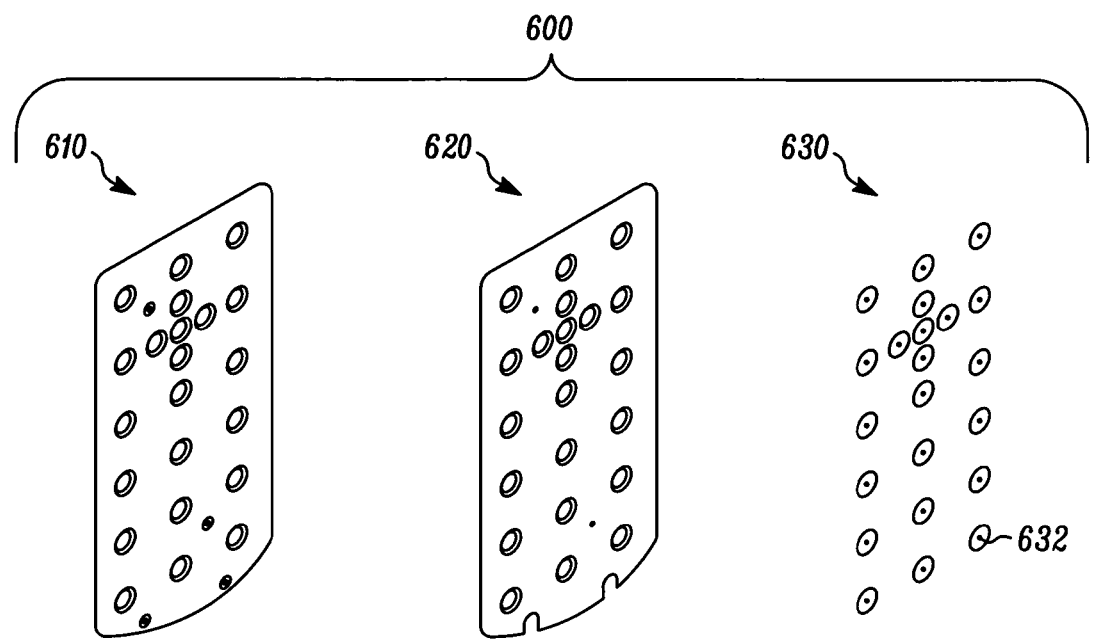
FIG. 6 is an exploded diagram of an exemplary switch-dome/luminescent layer.

In FIG. 1, the switch-dome/luminescent layer 120 comprises a luminescent layer, for example, an electroluminescent layer. In the exemplary embodiment, the luminescent layer functions as a carrier for an array of switch-domes aligned with corresponding key caps of the key cap layer. FIG. 6 is an exploded diagram of an exemplary switch-dome/luminescent layer assembly 600. The exemplary assembly comprises a luminescent layer 610. In one embodiment, the luminescent layer 610 is an electroluminescent layer, for example, the Durel DFLX-665 flexible electro-luminescent lamp manufactured by Rogers Corporation, Durel Division, Chandler, Ariz. In other embodiments, the luminescent layer may comprise other luminescent materials.

Figure 7:
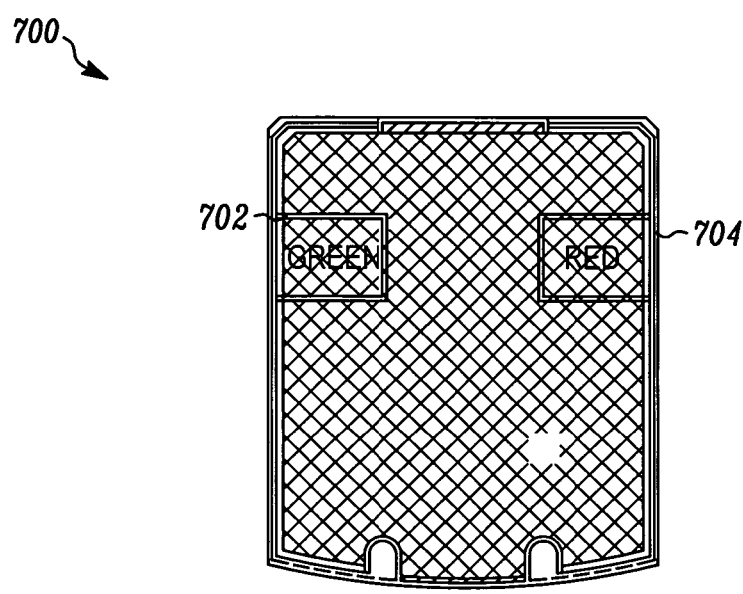
FIG. 7 is an exemplary luminescent layer having colored portions.

In one embodiment, the luminescent layer is colored or tinted to provide colored backlighting. In FIG. 7, the exemplary luminescent layer includes a green colored or tinted portion 702 and a red colored or tinted portion 704. The exemplary green and red colored portions may be located behind ON or SEND keys and OFF or END keys, respectively. In other embodiments, other colors may be used on these and other keys.

FIG. 6 also illustrates an adhesive layer 620, for example, a screen-printed adhesive, which is adhered to a side of the luminescent layer 610. Also included with the switch-dome/luminescent layer is an array of switch domes 630 adhered to the luminescent layer 610 by the adhesive layer 620 in alignment with the corresponding key caps. Alternatively, the domes 630 may be adhered to the luminescent layer 610 by discrete amounts of adhesive, without the requirement for the exemplary adhesive layer. In other embodiments, the switch-domes may be coupled to the luminescent layer by some other fastening means. Carrying the domes on the luminescent layer eliminates the need for the dedicated carrier, e.g., the Mylar layer, used in conventional designs.

In the exemplary embodiment, the switch-domes array 630 is adhered to a backside of the luminescent layer 610 by the intermediate adhesive layer 620. In one embodiment, the luminescent layer is a pliable material that conforms about the domed surface of the switch dome, thereby ensuring sufficient adhesion with the adhesive layer. In an alternative embodiment, the domes may be disposed between the luminescent layer and some other layer. Locating the switch-domes on the backside of the luminescent layer ensures that light emanates from the luminescent layer directly behind the key caps. In an alternative embodiment, the switch-domes are disposed on a front-side of, or atop, the luminescent layer. The use of a clear or translucent switch-dome will reduce any obstruction, by the dome, of light emanating from directly behind the key caps. In the exemplary embodiment, the switch-domes include a nipple 632, which provides good tactile performance by ensuring that the dome sweet spot is actuated. In other embodiments, the protrusion may be located in or on the backing material disposed on the key caps.

In alternative embodiments, the luminescent layer includes cutout portions that accommodate the switch-domes or portions thereof, thereby reducing the thickness of the assembly resulting from layer stacking. In other embodiments, a conventional carrier layer, for example, a Mylar layer, carries the switch-domes. The switch-dome carrier layer is positioned so that the domes adhered or otherwise fastened thereto are aligned with corresponding switches on a keypad circuitry layer. In FIG. 1, the exemplary luminescent layer dome carrier 120 is positioned so that the plurality of switch-domes, e.g., domes 122 and 124, disposed thereon are positioned over corresponding switches, e.g., switch 132 and 134, on the circuitry layer 130. The resulting assembly of the keypad layer assembly 110, the switch-dome/luminescent layer 120 and the circuitry layer provides for a relatively compact keypad assembly having an overall thickness between approximately 1.0 mm and 5.0 mm.

Figure 8:
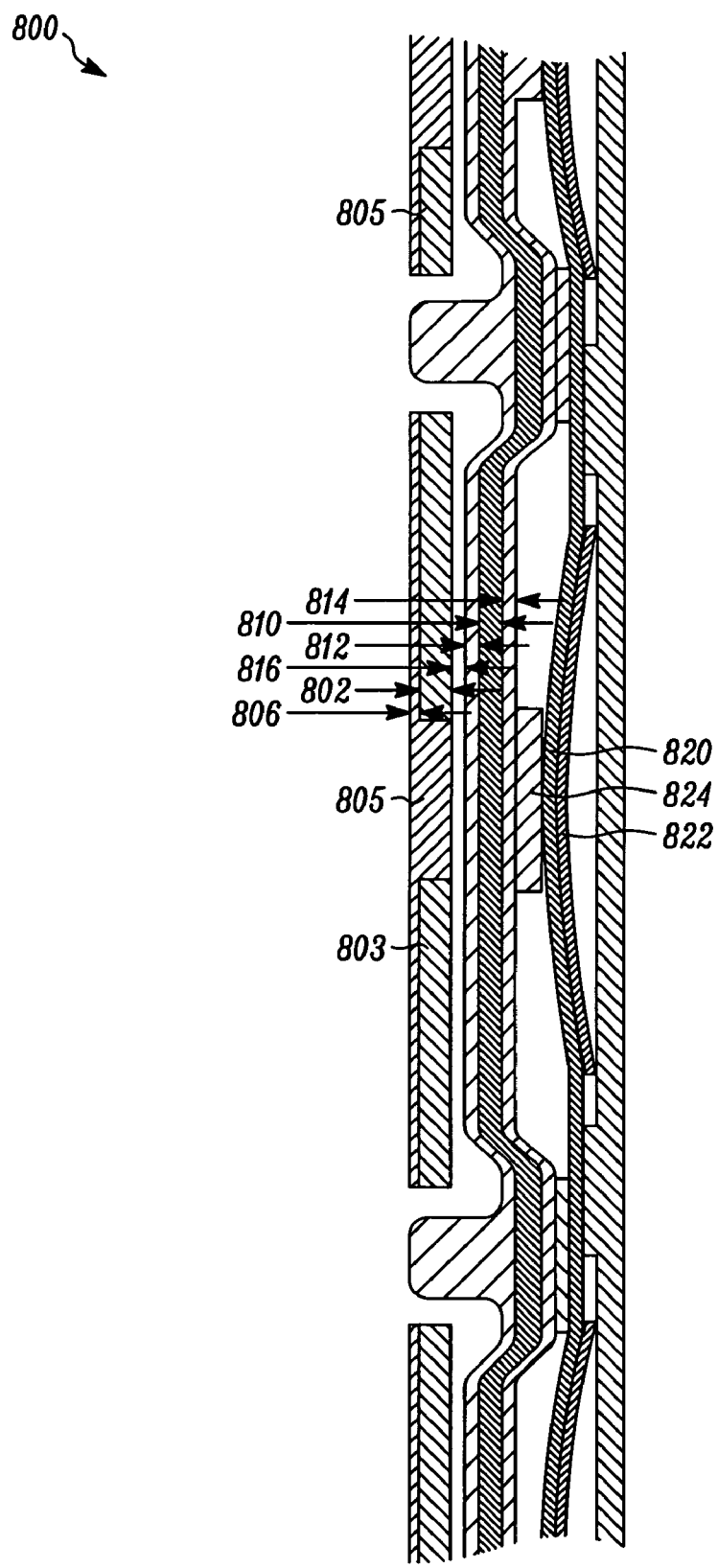
FIG. 8 is a sectional view of a portion of an exemplary keypad assembly.

In FIG. 8, a sectional portion of an exemplary keypad assembly 800 comprises an exemplary keypad assembly incorporating features discussed above. The sectional portion of FIG. 8 corresponds, for example, to a section through the directional cursor controller 230 and selection key 232 in FIG. 2. A key cap layer 802 includes a selection key cap 803 and a directional cursor controller input 805 corresponding to the selection key 232 and cursor controller 230 of FIG. 2. The exemplary key cap layer is approximately 0.15 mm and includes a surface coating 806, for example, a Urethane. The selection key cap includes an artwork aperture filled with a translucent material 805 to permit the passage of light from a backlight source, discussed below. A base film 810, which is preferably transparent, is co-molded between top and bottom silicone films 812 and 814, respectively. The key top layer is adhered to the base film by a glue layer 816. A luminescent layer 820 functions as a dome carrier. An exemplary dome 822 is located below the key cap 803. A plunger 824 is disposed between the key cap 803 and the dome 822. The plunger may be a part of, or attached, to the dome or to structure opposite the dome. The overall thickness of the exemplary keypad layer is less than approximately 1.2 mm.

Figure 9:
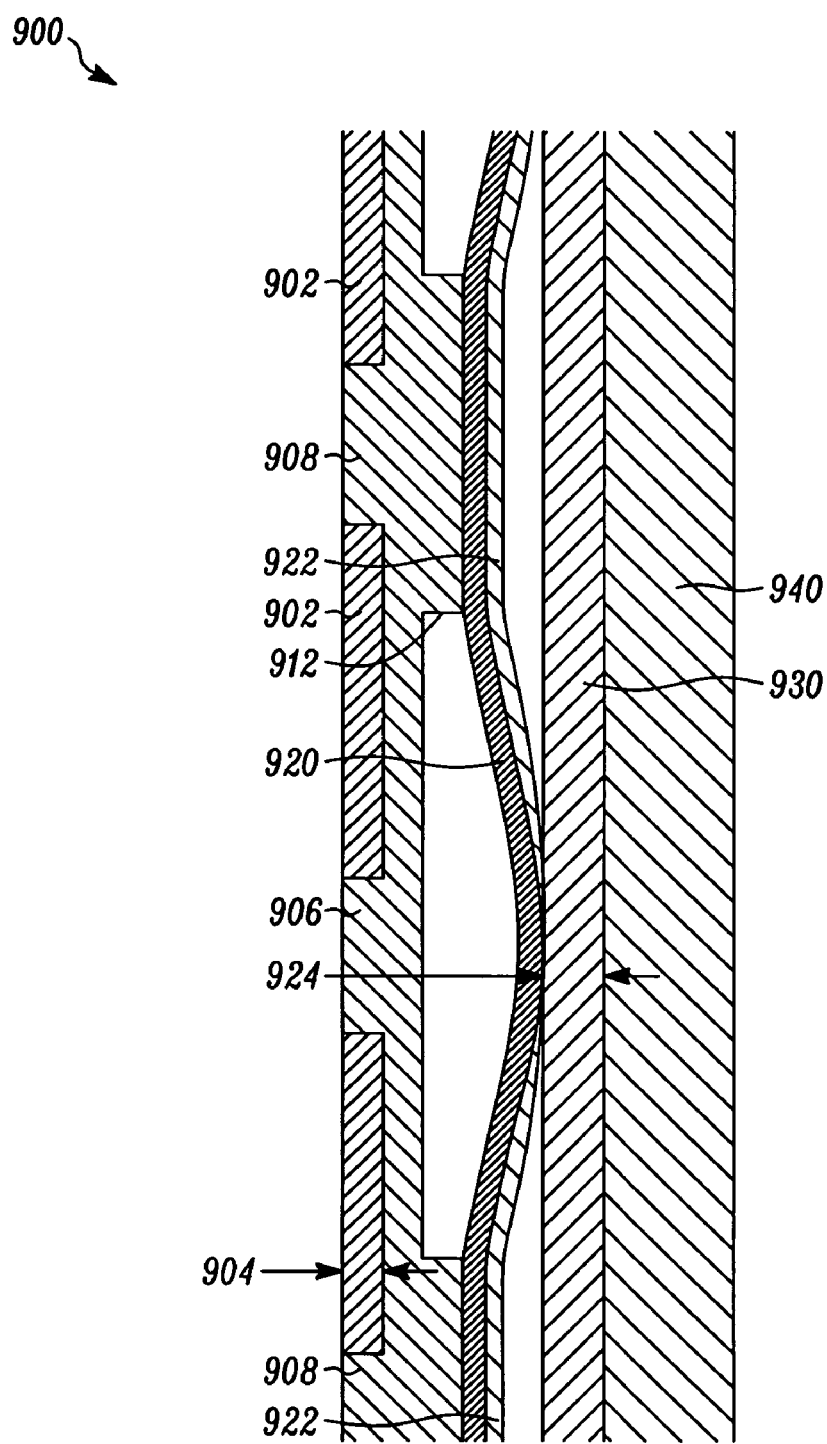
FIG. 9 is a sectional view of a portion of another exemplary keypad assembly.

In FIG. 9, another exemplary keypad assembly 900 comprises a key cap layer including a first key cap 902 and a second key cap 904. A flexible web portion 906 is disposed between adjacent key caps 902 and 904 and other neighboring key caps. A backing material 908 is disposed on a backside of key cap 902 and protrudes through an artwork aperture in the key cap, as illustrated. A plunger 912 is formed integrally with the backing material adjacent a switch-dome below the key cap 902. A luminescent layer 920 is disposed below the key cap layer assembly. The exemplary luminescent layer 920 functions as a carrier for switch-domes 922, which are adhered thereto by an intermediate adhesive layer 924, as discussed above. The luminescent layer and switch-domes are disposed on a circuit board 930, which is mounted in a housing 940.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A keypad, the keypad comprising:
a plurality of user interface key caps, the plurality of user interface key caps separated by spaces on at least some sides thereof;
a carrier portion interconnecting the plurality of user interface key caps,
the plurality of user interface key caps flexibly coupled to the carrier portion, and the plurality of user interface key caps and the carrier portion constitute a unitary member,
the plurality of user interface key caps and carrier portion formed of a metal material;
a flexible web interconnecting at least some of the plurality of user interface key caps.

2. The keypad of claim 1, the plurality of user interface key caps and carrier portion having a thickness not more than 1.5 mm.

3. The keypad of claim 1,
the flexible web and the plurality of user interface key caps comprise a common material and forming a unitary member,
the flexible web having a thickness less than a thickness of the user interface key caps.

4. The keypad of claim 1, a rigid backing disposed on a backside of at least some of the plurality of user interface key caps.

5. The keypad of claim 4,
the rigid backing is a plastic material,
the flexible web interconnecting the plurality of user interface key caps is an elastic material.

6. A keypad, the keypad comprising:
a plurality of user interface key caps, the plurality of user interface key caps separated by spaces on at least some sides thereof;
a carrier portion interconnecting the plurality of user interface key caps, the plurality of user interface key caps flexibly coupled to the carrier portion, the plurality of user interface key caps and the carrier portion constitute a unitary member and are formed of the same material;
a flexible web interconnecting at least some of the plurality of user interface key caps, the flexible web disposed on a backside of at least some of the plurality of user interface key caps,
the flexible web interconnecting the plurality of user interface key caps comprising an elastic material different than a material of the user interface key caps.

7. A keypad, the keypad comprising:
a plurality of user interface key caps, the plurality of user interface key caps separated by spaces on at least some sides thereof;
a carrier portion interconnecting the plurality of user interface key caps,
the plurality of user interface key caps flexibly coupled to the carrier portion, the plurality of user interface key caps and the carrier portion constitute a unitary member, the unitary member is a metal material;
a flexible web interconnecting at least some of the plurality of user interface key caps, the flexible web is a resilient material.

8. A keypad, the keypad comprising:
a plurality of user interface key caps, the plurality of user interface key caps separated by spaces on at least some sides thereof;
a carrier portion interconnecting the plurality of user interface key caps, the plurality of user interface key caps are metal, the plurality of user interface key caps flexibly coupled to the carrier portion, the plurality of user interface key caps and the carrier portion constitute a unitary member;
a rigid backing disposed on a backside of at least some of the plurality of user interface key caps;
a flexible web interconnecting at least some of the plurality of user interface key caps,
the flexible web interconnecting the plurality of user interface key caps is an elastic material.

* * * * *